United States Patent [19]

Matsumoto

[11] 4,333,112
[45] Jun. 1, 1982

[54] IMAGE SCANNING APPARATUS AND METHOD

[75] Inventor: Kazuya Matsumoto, Yokohama, Japan

[73] Assignee: Canon Kabushiki Kaisha, Tokyo, Japan

[21] Appl. No.: 111,973

[22] Filed: Jan. 14, 1980

[30] Foreign Application Priority Data

Jan. 20, 1979 [JP] Japan ................................. 54-5816

[51] Int. Cl.³ ....................... H04N 1/22; H04N 1/40; H04N 1/10
[52] U.S. Cl. .................................... 358/298; 358/283; 358/284; 358/293; 358/296
[58] Field of Search ............... 358/284, 285, 287, 294, 358/296, 283, 298, 293

[56] References Cited

U.S. PATENT DOCUMENTS

| | | | |
|---|---|---|---|
| 3,592,963 | 7/1971 | Young | 358/294 |
| 3,775,559 | 11/1973 | Vieri | 358/294 |
| 3,984,629 | 10/1976 | Gorog | 358/294 |
| 4,149,197 | 4/1979 | Kos et al. | 358/294 |
| 4,189,754 | 2/1980 | Gamblin | 358/296 |
| 4,203,136 | 5/1980 | Welldendorf et al. | 358/256 X |

Primary Examiner—Aristotelis M. Psitos
Attorney, Agent, or Firm—Fitzpatrick, Cella, Harper & Scinto

[57] ABSTRACT

This invention relates to an apparatus and method for scanning and duplicating documents with high resolution. The apparatus herein disclosed includes an array of printing nozzles and a photosensor comprising sensor elements the number of which per line is smaller than the full number of desired image resolution points and which are arranged two-dimensionally. Small apertures are disposed optically conjugate with said photosensor in such manner that light from the desirable resolution points may fall on the corresponding individual sensor elements through a focusing lens. Through an optical system comprising another focusing lens and two rotary mirrors, an image of the document is formed on the mask. The image of document on the mask is moved in two orthogonal directions while the two mirrors being rotated sequentially to scan the document and detect image points of desirable resolution. Signals obtained therefrom are used to operate the printing nozzles.

7 Claims, 5 Drawing Figures

IMAGE SCANNING APPARATUS AND METHOD

BACKGROUND OF THE INVENTION

1. Field of the Invention

The present invention relates to an apparatus and method for scanning documents with high resolution. Also, the present invention relates to an image scanning and copying apparatus of the type in which an original such as a document is two-dimensionally scanned to produce image signals and an image is formed by driving a plurality of printing elements such as ink jet heads by means of the image signals.

2. Description of the Prior Art

Recently, a remarkable progress has been made in the image scanning and copying apparatus. At present, aiming at further development of the technique, many efforts are being made to increase the resolution of image detection and print to speed up the image detecting and printing operation and to simplify the signal processing system used in the course of image detection and printing.

The printing system most widely used in the above mentioned type of image forming apparatus uses an array of printing elements arrayed in one single row. The array of printing elements is moved in the direction normal to the row of the printing elements to two-dimensionally scan a document and then form an image thereof by only one scanning. However, this conventional printing system has a disadvantage. It is impossible for this system to record such image which has a higher resolution than the pitch of the printing elements. For example, when ink jet nozzles are used as the printing elements, the possible minimum space between nozzles is 0.25 mm for any array of ink jet nozzles available according to the prior art. Therefore, the maximum recording resolution attainable by it is 4 image points/mm. Such printing resolution is obviously not enough to record images contained in common documents. The resolution desired for this purpose is at least 12 image points/mm. To realize this objective, it is also required to provide a detection apparatus which is able to detect high resolution image point signals.

A high resolution copying apparatus has been disclosed in U.S. Pat. No. 4,112,469 (Japanese Patent Application laid open No. 136,835/1978). The known apparatus uses a sensor array comprising N (in number) photo diodes arranged at regular intervals. The sensor array detects an original document in a manner of interlaced scanning with high resolution. Recording is carried out using a printing head comprising N nozzles arrayed in regular intervals in the same interlaced fashion as used at the time of detection scanning to effect high resolution recording.

SUMMARY OF THE INVENTION

To scan the entire two-dimensional area of a document using a one-dimensional sensor array there is required such scanning optical system which moves the sensor array image on the document in the direction normal to the array some distance corresponding at least to the width of the document. As will be easily seen, such scanning optical system has to have a very high scanning speed to meet the requirement of high speed recording. Since the technique of two-dimensional sensor array has been developed rapidly in these years, it is desirable to moderate the high speed required for scanning optical system by using the two-dimensional sensor array. However, to realize it there remain some problems to be solved. The main problems to be mentioned concern the following two points:

Firstly, it needs a detecting system which is able to detect image points in a high resolution corresponding to the desirable printing resolution while using a two-dimensional sensor array. Generally speaking, the number of image points to be detected to meet the desirable printing resolution is far larger than the number of sensor elements in a two-dimensional sensor array or the image resolution point pitch of an image is smaller than the possible minimum sensor element pitch. Therefore, it is required to provide such detecting apparatus which detects all the image resolution points using an interpolation technique. In this case, the interpolation technique used therein must be convenient to the printing system then used. In other word, the interpolation technique preferably used therein is of the type which allows the use of a simplified signal processing system.

Secondly, therefore, it is required to simplify the signal processing system. The signal processing system provisionally stores image point signals from the two-dimensional sensor array and then rearranges them for interlaced printing. There is need to provide apparatus which uses a most suitable image detecting and printing system for simplification of the signal processing part.

Accordingly, it is an object of the invention to provide an image scanning apparatus and method having the advantage of high resolution.

It is another object of the invention to provide an image scanning apparatus and method having the advantage of simplified scanning mechanism by employing a two-dimensional sensor array.

It is a further object of the invention to provide an image detecting and copying apparatus and method having the advantages of high resolution and no need of particular memory and signal rearrangement processing apparatus while using a two-dimensional sensor array.

Other and further objects, features and advantages of the invention will appear more fully from the following description taken in connection with the accompanying drawings.

DESCRIPTION OF THE PREFERRED EMBODIMENTS

Figure 1:
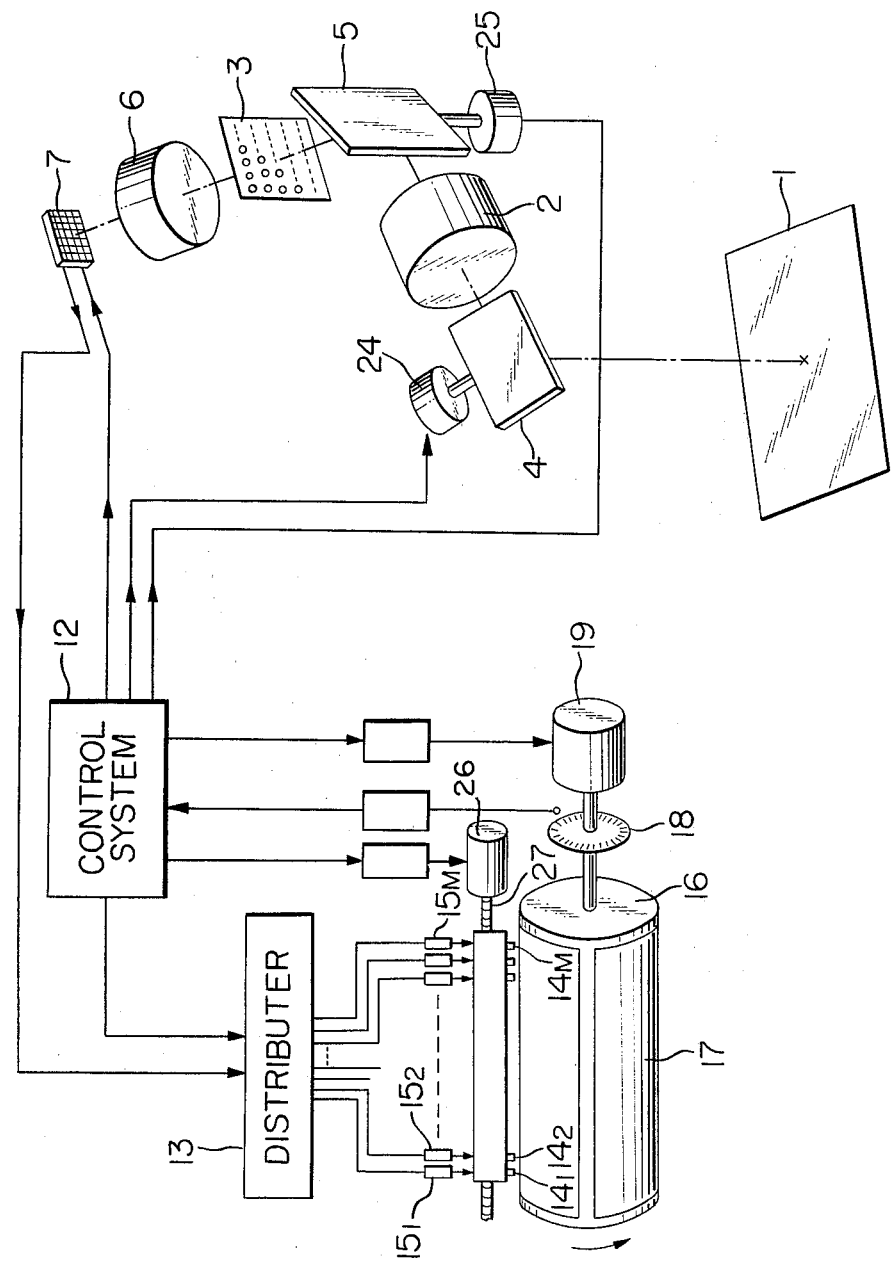
FIG. 1 schematically shows an embodiment of the invention.

In the apparatus shown in FIG. 1, a reduced image of a document 1 is formed on a mask 3 through an optical system comprising a first scanning mirror 4, an image forming lens system 2 and a second scanning mirror 5. The scanning mirrors 4 and 5 are mounted rotatably with rotary motors 24 and 25 respectively. The scanning mirrors deflect the beam coming from the document so as to move the document image on the mask 3 in two directions orthogonal to each other, that is, in longitudinal direction and in transverse direction on the surface of the mask respectively. The reduced image of the document 1 and the mask 3 are further focused on the detecting area of a two-dimensional sensor array 7 through a relay lens 6. The two-dimensional sensor array 7 comprises a number of sensor elements arranged in M rows and N lines to form a matrix. The area on which the image of two-dimensional region of the document to be scanned and the image of the mask are formed, is nearly coincident with the entire detecting area of the sensor array. Therefore, if the mask be absent, then the document will be detected each resolution point by each sensor element. Here, one resolution point is one small area given by dividing the document area by M×N.

Assuming that the number of desired image resolution points contained in a document is s·M in traverse direction and t·N in longitudinal direction, it is required to detect a smaller area as unit image resolution point. The smaller area as unit image resolution point is given by further dividing the above given small area $$\left( \frac{\text{document area}}{M \times N} \right)$$

by s×t. The mask 3 has small apertures arranged in M rows and N lines corresponding to the arrangement of sensor elements in the two-dimensional sensor array mentioned above. The size of each the small aperture is nearly equal to the size of each the image resolution point of an image of the document 1 formed on the mask 3. Every one of the small apertures makes the light from the above said smaller element areas of the document fall on every corresponding sensor element. When detection of the document is carried out using the above arrangement, the surface of the document is detected at M×N sampling points. Hereinafter, an image of the M×N sampling points detected at once by one self scanning of the two-dimensional sensor array is referred to as element image.

As described above, the number of desirable image resolution points is s·M in traverse direction and t·N in longitudinal direction provided that the smaller area defined above be taken as unit desirable image resolution point. The number of sampling points which can be sampled once by the two-dimentional sensor array is M×N. As seen from it, the two-dimensional sensor array detects those resolution points interlaced at intervals of s points in traverse direction and t points in longitudinal direction every time. Positional relation among sensor elements 9, images of mask apertures 8 and images of resolution points of document 10 on the detecting area of the two-dimentional sensor 7 is illustrated in FIG. 2.

Figure 2:
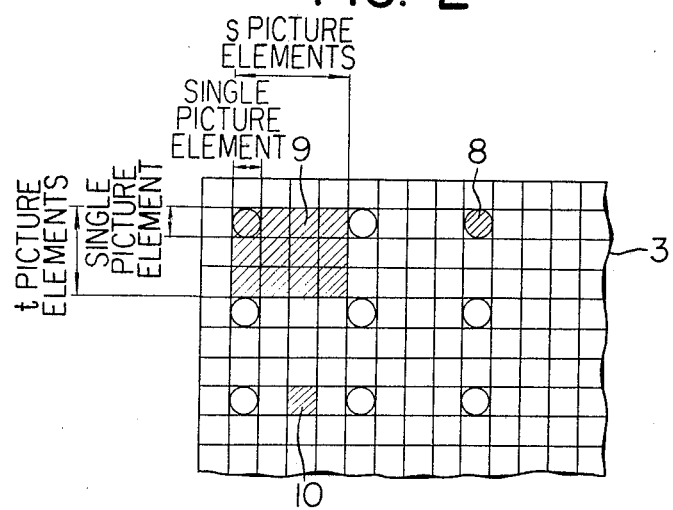
FIG. 2 shows an example of the mask used therein with the image of document formed thereon.

In the position of images of apertures shown in FIG. 2, M×N image resolution points are firstly detected by the two-dimensional sensor and therefore M×N signals of firstly detected image resolution points are produced. These element image signals are introduced into a distributor 13 (FIG. 1).

To assist in better understanding of the manner of operation of the shown apparatus, the read-out mechanism of a two-dimensional sensor will be described briefly hereinafter.

Figure 3:
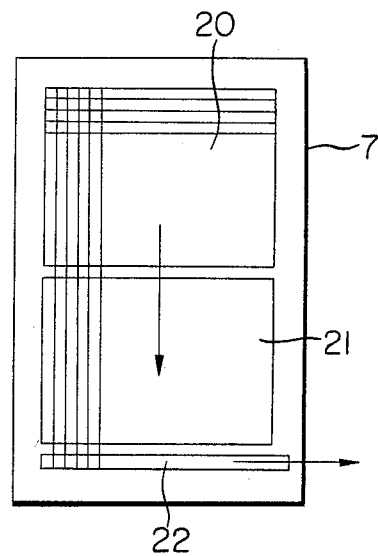
FIG. 3 shows the read-out mechanism of two-dimensional sensor array.

Two-dimensional sensors known in the art can be classified in several groups according to the difference in type of read-out. FIG. 3 shows one type of the known two-dimensional sensor which is generally called frame transfer type of two-dimensional sensor. The two-dimensional sensor 7 is composed of a sensing part 20, a storing (memory) part 21 and a shift register part 22. In conformity with the previous description, the sensing part comprises M×N sensor elements and the storing part has the same number of bits. Element image signals photo-electrically converted at the sensing part 20 are frame transferred to the storing part 21 which stores the signals in the corresponding bits.

Among the signals stored in the storing part 21, those signals constituting one line in traverse direction (M bits) are driven by transfer clock issued from a control system 12 (FIG. 1) through the shift register part 22 to sequentially read out the signals to the exterior. The distributor 13 distributes these signals one by one sequentially to driving systems $15_1, 15_2 \ldots 15_M$ of a recording head 14, as shown in U.S. Pat. No. 3,322,064 (FIG. 1). The recording head is disposed opposed to a recording paper 17 set on a drum 16 and comprises M ink jet nozzles $14_1, 14_2, \ldots 14_M$ regularly arranged on a straight line at intervals of s image resolution points of an image to be recorded. Here, it should be noted that the size of one image resolution point on the recorded image may be different from that of the document according to the magnification for recording then used. The ink jet nozzles $14_1, 14_2 \ldots 14_M$ are driven by the driving systems $15_1, 15_2 \ldots 15_M$ respectively.

During the time of the signals of one line being recorded on the recording paper by the above nozzles, the drum 16 is driven into rotation at uniform speed by the rotary motor 19. The rotation angle of the drum during the time is preset to a value corresponding to t resolution points of the recorded image relative to the first nozzle $14_1$. In this position, the element image signals in the second line stored in the storing part 21 are applied sequentially to the nozzles $14_1, 14_2 \ldots 14_M$ in the same manner as that for the first line signals and recording of the second line signals is carried out on the recording paper. This operation of recording is repeated N times for one complete revolution of the drum to complete recording of the whole first element image in N lines.

In the apparatus shown in FIG. 1, the function of the scanning mirror 4 is to scan the document image on the mask 3 in longitudinal direction. The rotary motor 24 with which the scanning mirror 4 is connected is precisely controlled by the control system 12 in such manner that the inclination of the scanning mirror 4 may be changed by a very minute angle just enough to shift the image on the mask 3 by one image resolution point per one revolution of the drum 16. Therefore, signals of the second element image which is shifted from the first element image by one image resolution point have been already transferred to the storing part and prepared for reading out when the drum 16 completes one revolution to record the first element image. Read-out of the second element image signals is started when the drum 16 finishes its one revolution and the first nozzle $14_1$ comes to a position advanced by one image resolution point from the position for recording the first element image. Recording the second element image is carried out in the same manner as that of the first one.

The signal for starting the recording operation is obtained from a rotary encoder 18 directly connected with the drum 16, as shown in U.S. Pat. No. 3,192,854 (FIGS. 1 and 9). The rotary encoder 18 issues one reference pulse per one revolution of the drum 16. The pulse signal is delivered to the control system 12 and forms a recording start signal. For example, when the n-th element image is to be recorded, a recording start signal is given to the shift register part 22 of the two-dimensional sensor 7 and the recording control system 13 after (n−1) image resolution point signals are counted over from the time of input of the above pulse signal.

Figure 4:
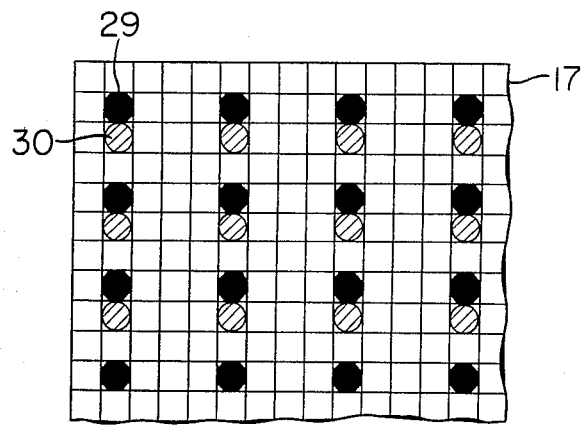
FIG. 4 illustrates the process of recording by a printing head.

FIG. 4 illustrates the position of recorded first and second element images together. Synchronizing signal for reading out and printing the image resolution point signals in every line is also obtained from the rotary encoder 18.

By sequentially recording t element images in this manner there is obtained a record of image composed of a large number of image resolution points closely arranged with the desirable resolution in longitudinal direction. For this longitudinal image recording, the scanning mirror 4 conducts one scanning on the document in the longitudinal direction. In other words, t revolutions of the drum 16 correspond to one scanning and the width of one scanning corresponds to the distance by which the document image on the mask 3 is shifted by t image resolution points.

Figure 5:
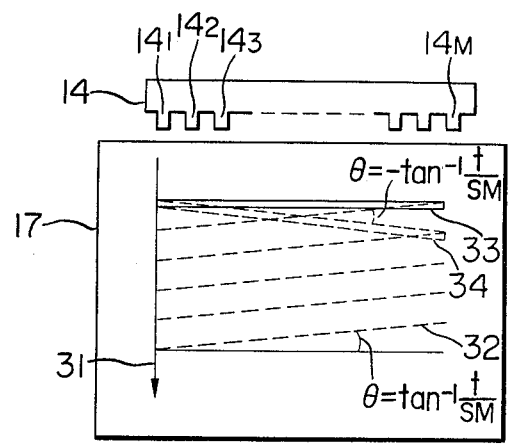
FIG. 5 illustrates an example of correction relating to some inclination of scanning line for printing.

As shown in FIG. 5, the recorded image 32 of one line lies on a line inclined by $$\theta = \tan^{-1}\left(\frac{t}{s \cdot M}\right)$$

relative to the base line when the recording was carried out by the recording head 14 positioned in a position 33 normal to the direction of rotation of the drum 16. This undesirable inclination of line can be prevented by disposing the head 14 inclined by $$\theta = -\tan^{-1}\left(\frac{t}{s \cdot M}\right)$$

relative to the rotation direction 31 of the drum as suggested by the phantom 34. When the position of the recording head is corrected in this manner there can be obtained a record line lying on a line normal to the rotation direction 31.

Scanning in traverse direction is carried out by the scanning mirror 5 connected with another rotary motor 25 in the same manner as that of the longitudinal scanning described above. Scanning speed in traverse direction on the mask 3 is at the pitch of one image resolution point per t revolutions of the drum 16. Also, the recording head 14 is moved in the direction along the drum shaft at the same resolution point pitch by the motor 26 through a screw member 27. Therefore, as soon as the first step for recording t element images in longitudinal direction comes to end, the second step for recording the next t element images shifted by one image resolution point relative to those of the first step is started under the control by the control system 12. In this manner, s steps of scanning and recording are carried out repeatedly. When the s steps of scanning and recording are all completed, a complete image composed of s·M×t·M image resolution points is obtained on the recording paper 17.

Scanning of the document image in longitudinal direction by scanning mirror 4, scanning of the document image in traverse direction by scanning mirror 5 and scanning of the recorded image in traverse direction by recording head 14 may be of uncontinuous, namely step-by-step system or of continuous system. From a technical point of view, a continuous system is preferable.

Now, the relation between scannings orthogonal to each other is described.

Let the sensor detection clock frequency be fc/sec, then repeating frequency of the recording head is fR=fc/M and the rotational speed of drum is $$\frac{fc}{M \cdot N} \times 60 \text{ rpm}.$$

In case that the scanning mirrors are rotated stepwise, the step frequency is fc/tMN for scanning mirror 4 and is fc/tsMN for scanning mirror 5. Therefore, the time required to record a sheet of document is T=tsMN/fc sec.

As an example, the following concrete data are given:
M=320, N=256, t=s=10 and fc=2.73 MHz.
For the above conditions,
the number of recorded image resolution points: 3200×2560;
recording time: 3 seconds;
drum rotational speed: 2000 rpm;
recording head frequency: 8.53 KHz;
step frequency of scanning mirror 4: 3.33 Hz and;
step frequency of scanning mirror 5: 0.333 Hz.

As a further example, such case may be considered that the document to be recorded is of A4 format size, namely 294 mm in width×210 mm in length, focusing magnification of the image forming lens system 2 is 1/6 and focusing magnification of the relay lens 6 is 1/5. In this case, the pitch of image resolution points on the document is 83.3 μm and that on the mask is 13.8 μm. Therefore, the size of small apertures on the mask 3 is about 14 μmφ and from the condition of t=s=10 the pitch of apertures is about 140 μm. These apertures appear on the two-dimensional sensor as images of 28 μm in pitch. This means that a two-dimensional sensor comprising 320×256 in number of sensor elements arranged at a pitch of 28 μm enables to carry out the high quality detection described above.

In the embodiment shown in FIG. 1, the relay lens 6 and two-dimensional sensor 7 are disposed behind the mask 3. However, another arrangement can be used in the scope of the invention. For example, a mask having small apertures may be attached directly to the two-dimensional sensor. Also, such two-dimensional sensor may be used which has sensor elements whose detection area is of such shape and size as given by reducing the sensor element pitch by 1/s in traverse direction and by 1/t in longitudinal direction. In this case, each sensor element has a detecting area corresponding to each image resolution point. If such two-dimensional sensor is used, the shift of the relative position between the document image and the two-dimensional sensor can be effected without using the scanning mirrors 4 and 5. It may be accomplished by moving the two-dimensional sensor by s steps in traverse direction and by t steps in longitudinal direction while keeping the document image stationary. Also, in the arrangement shown in FIG. 1, it is possible to move the mask 3 while keeping the scanning mirrors 4 and 5 in fixed positions. But, this is not preferable. In general, the sensor element used in a two-dimensional sensor has a detecting area only on a part of the element and the remaining part is non-sensitive area containing transfer portion and overflow drain portion. Therefore, when the mask is moved, detection of image becomes impossible at the non-sensitive part of sensor element.

Printing elements used in the apparatus according to the invention is never limited to ink jet nozzles particularly shown in the above embodiment. Thermal heads or heads for forming latent images also may be used. Further, it is not always necessary to scan the entire surface of a document at one time. The area of document may be divided into many sections so that scanning can be carried out section by section. In this case, the recording head is not required to have the same width as that of the recording medium.

As will be understood from the foregoing, the present invention permits provision of a novel type of scanning and detecting apparatus. An original image is detected by a two-dimensional sensor while sampling the image resolution points. Signals of sampled image points are printed by a printing head comprising many printing elements at the positions corresponding to the sampling positions. Detecting and printing operations are repeated while sequentially shifting the relative position between the original image and the two-dimensional sensor as well as the relative position between the writing head and the printing medium. Thus, a complete image of an original is printed with high image quality by using an interpolation.

Also, the present invention permits provision of an image forming apparatus for which the signal processing system can be simplified. There is no need of using particular memory apparatus and signal rearranging apparatus for processing image point signals read out from the two-dimensional sensor.

Moreover, since the output signals from the two-dimensional sensor appear in a form similar to that of signals from a common television camera, the output signals can be processed in a simple manner by connecting the outline of the apparatus according to the above embodiment to the signal processing system of a television system. The apparatus according to the invention is excellent in versatility.

While the invention has been particularly shown and described with reference to preferred embodiments thereof, it will be understood by those skilled in the art that the foregoing and other changes in form and details can be made therein without departing from the spirit and scope of the invention.

I claim:

1. A method of scanning and detecting image with high resolution comprising the steps of:
    detecting an element image which comprises points at a pitch t times larger than the desirable resolution point pitch in a first direction and at a pitch s times larger than the same desirable resolution point pitch in a second direction by two-dimensional sensing means;
    transferring the detection signals together to a memory part to store the signals therein;
    effecting a relative movement between said two-dimensional sensing means and said image by an amount corresponding to one desirable resolution point;
    transferring the signals previously stored to an output part sequentially; and
    scanning the entire image with high resolution by repeating the above cycle of steps sequentially up to t×s times.

2. A method according to claim 1, wherein said detecting step includes projecting an image on a mask having therein a plurality of small apertures each corresponding to the desirable resolution point.

3. A method of scanning and recording image with high resolution comprising the steps of:
    detecting an element image which comprises points at a pitch t times larger than the desirable resolution point pitch in a first direction and at a pitch s times larger than the same desirable resolution point pitch in a second direction by two-dimensional sensing means;
    transferring the detection signals together to a memory part to store the signals therein;
    effecting a relative movement between said two-dimensional sensing means and said image by an amount corresponding to one desirable resolution point;
    transferring the signals previously stored to a recording head sequentially;
    recording all the signals previously stored on a recording medium while moving one of said recording head and recording medium relatively to the other; and
    scanning the entire image by repeating the above cycle of steps up to t×s times and sequentially recording the detected information on said recording medium with high resolution.

4. Apparatus for scanning and detecting image comprising:
    (a) area photosensor, comprising a plurality of sensor elements two-dimensionally arranged therein, for producing an output in response to a signal applied thereto;
    (b) an aperture mask having a plurality of small apertures each so formed as to lead only the light from one desirable resolution point of an image onto one of said sensor elements;
    (c) first driving means for effecting a first relative movement between said image and mask in a first direction;
    (d) second driving means for effecting second relative movement between said image and mask in a second direction different from said first direction; and
    (e) control means for applying the signal to said area photosensor for each relative movement by one pitch of the desirable resolution points in said first direction, said control means driving said second driving means for each relative movement by one pitch of the sensor elements in said first direction, thereby producing the relative movement by one pitch of the desirable resolution points in said second direction.

5. Apparatus for scanning and copying image comprising:
    (a) two-dimensional sensing means, for producing an output in response to a signal applied thereto, and having a plurality of sensor elements disposed to detect only the desirable resolution points of an image and arranged at a larger pitch than that of said desirable resolution points;
    (b) first driving means for effecting first relative movement between said image and sensing means in a first direction;
    (c) second driving means for effecting second relative movement between said image and sensing means in a second direction different from said first direction;

(d) scanning control means for applying the signal to said sensing means for each relative movement by one pitch of the desirable resolution points in said first direction, said scanning control means driving said second driving means for each first relative movement by one pitch of said sensor elements in said first direction, thereby producing the relative movement by one pitch of the desirable resolution points in said second direction;

(e) a printing head including a series of printing elements arranged at a pitch corresponding to that of said sensor elements;

(f) print control means responsive to said printing elements;

(g) third driving means for effecting third relative movement between said printing head and a recording medium, said third relative movement being related to said first relative movement; and (h) fourth driving means for effecting fourth relative movement between said printing head and recording medium in a different direction from that by said third driving means.

6. Apparatus according to claim 5, wherein said first and second driving means comprise two mirrors rotatable about different axes from each other.

7. A method of scanning and detecting image with high resolution comprising the steps of:

detecting an element image which comprises points at a pitch larger than desirable resolution point pitch at least in a direction by two-dimensional sensing means;

transferring the detected signals together to a memory part to store the signals therein;

effecting relative movement between said two-dimensional sensing means and said image by said desirable resolution point pitch in said direction for next detecting step;

transferring the signals previously stored in said memory part to an output part sequentially during said next detecting step; and scanning the entire image with high resolution by repeating the above cycle of steps sequentially.

* * * * *